(12) United States Patent
Tong (10) Patent No.: US 11,930,283 B2
(45) Date of Patent: Mar. 12, 2024

(54) CAMERA SYSTEMS FOR BENDABLE ELECTRONIC DEVICES

(71) Applicant: Apple Inc., Cupertino, CA (US)

(72) Inventor: Katherine E. Tong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 17/481,678

(22) Filed: Sep. 22, 2021

(65) Prior Publication Data

US 2022/0006964 A1 Jan. 6, 2022

Related U.S. Application Data

(63) Continuation of application No. 16/515,463, filed on Jul. 18, 2019, now Pat. No. 11,178,342.

(51) Int. Cl.
*H04N 23/90* (2023.01)
*G06F 1/16* (2006.01)
*G06F 1/18* (2006.01)
*G06T 3/40* (2006.01)
*H04N 13/243* (2018.01)
*H04N 23/54* (2023.01)
*H04N 23/57* (2023.01)
*H04N 23/63* (2023.01)
*H04N 23/698* (2023.01)

(52) U.S. Cl.
CPC ............. *H04N 23/90* (2023.01); *G06F 1/163* (2013.01); *G06F 1/1652* (2013.01); *G06F 1/182* (2013.01); *G06T 3/4038* (2013.01); *H04N 13/243* (2018.05); *H04N 23/54* (2023.01); *H04N 23/57* (2023.01); *H04N 23/632* (2023.01); *H04N 23/698* (2023.01); *G06F 1/1616* (2013.01)

(58) Field of Classification Search
CPC ............. H04N 13/239; H04N 13/243; H04N 2213/001; H04N 5/2252; H04N 5/2253; H04N 5/2257; H04N 5/2258; H04N 5/23203; H04N 5/23238; H04N 5/232935; H04N 5/247; G06T 1/0007; G06T 3/4038; G06F 1/1616; G06F 1/1626; G06F 1/163; G06F 1/1652; G06F 1/1656; G06F 1/182
See application file for complete search history.

(56) References Cited

U.S. PATENT DOCUMENTS 9,046,918 B2 6/2015 Kim et al.
9,578,149 B2 2/2017 Moon et al.
(Continued)

FOREIGN PATENT DOCUMENTS

EP 3203350 A1 8/2017
WO 2016083850 A2 6/2016

*Primary Examiner* — Anner N Holder
(74) *Attorney, Agent, or Firm* — Treyz Law Group, P.C.; G. Victor Treyz; Jinie M. Guihan (57) ABSTRACT

An electronic device may have a flexible housing formed from flexible fabric, flexible polymer, or other flexible materials. Cameras may be mounted on the housing. The housing may be bent into different configurations such as a configuration in which the housing has a convex surface facing an exterior region and a configuration in which the housing has a concave surface facing the exterior region. The cameras may have respective camera image capture directions. By reorienting the cameras by bending the housing, the cameras can be used to capture panoramic images or three-dimensional images.

20 Claims, 9 Drawing Sheets

(56) References Cited

U.S. PATENT DOCUMENTS

| | | |
|---|---|---|
| 9,807,213 B2 | 10/2017 | Stewart |
| 10,201,089 B2 | 2/2019 | Huitema et al. |
| 10,320,025 B2 | 6/2019 | Hiroki et al. |
| 2009/0051778 A1* | 2/2009 | Pan ................... H04N 23/698 348/E5.024 |
| 2009/0265971 A1 | 10/2009 | Cook |
| 2010/0007714 A1 | 1/2010 | Kim et al. |
| 2013/0335521 A1 | 12/2013 | Lin |
| 2014/0176428 A1 | 6/2014 | Hsieh |
| 2014/0210706 A1 | 7/2014 | Park et al. |
| 2014/0372427 A1 | 12/2014 | Lehmann et al. |
| 2015/0070523 A1* | 3/2015 | Chao ................... G06T 3/4038 348/218.1 |
| 2015/0111558 A1 | 4/2015 | Yang |
| 2015/0195926 A1 | 7/2015 | Kandur Raja et al. |
| 2015/0378557 A1 | 12/2015 | Jeong et al. |
| 2016/0187122 A1 | 6/2016 | Krimon et al. |
| 2016/0370881 A1 | 12/2016 | Jung et al. |
| 2017/0034320 A1 | 2/2017 | Stewart |
| 2017/0139532 A1 | 5/2017 | Franklin et al. |
| 2017/0163860 A1 | 6/2017 | Frank et al. |
| 2017/0169759 A1 | 6/2017 | Jang |
| 2017/0185289 A1 | 6/2017 | Kim et al. |
| 2017/0221456 A1 | 8/2017 | Kim et al. |
| 2017/0272559 A1 | 9/2017 | Cavallaro et al. |
| 2017/0357473 A1 | 12/2017 | Kim |
| 2018/0112943 A1 | 4/2018 | Kealoha |
| 2018/0160046 A1 | 6/2018 | Nash et al. |
| 2018/0189534 A1 | 7/2018 | AlNasser et al. |
| 2018/0324356 A1 | 11/2018 | Sarraju et al. |
| 2018/0338126 A1 | 11/2018 | Trevor et al. |
| 2019/0043038 A1 | 2/2019 | Jang et al. |
| 2019/0230283 A1 | 7/2019 | Ollier et al. |
| 2019/0289223 A1* | 9/2019 | Abbas ................... H04N 23/698 |
| 2020/0348627 A1 | 11/2020 | Connor |

\* cited by examiner

*FIG. 11*

CAMERA SYSTEMS FOR BENDABLE ELECTRONIC DEVICES

This application is a continuation of U.S. patent application Ser. No. 16/515,463, filed on Jul. 18, 2019, which is hereby incorporated by reference herein in its entirety.

FIELD

This relates generally to electronic devices, and, more particularly, electronic devices with image sensors.

BACKGROUND

Electronic devices may have image sensors. For example, a rear-facing camera on a cellular telephone may be used to capture images of a scene. To capture wide angle photographs, some cellular telephones support panoramic image capture modes. In this mode of operation, a user sweeps the camera of a cellular telephone across a scene during image capture operations. After multiple sequential images of different parts of the scene have been captured in this way, the cellular telephone may stitch together the images to form a panoramic photograph.

It can be challenging to capture panoramic images in this way. Images may become blurred due to camera movement and/or portions of a scene may move during image capture operations. Alignment issues may also arise causing desired portions of an image to be cut off unintentionally.

SUMMARY

An electronic device may have a housing. The housing may separate an interior region from an exterior region surrounding the housing. Electrical components for forming control circuitry, sensors, and other devices may be received within the interior region.

The housing may be a flexible housing having flexible housing walls formed from flexible fabric, flexible polymer, or other flexible materials. The electronic device may have cameras that are mounted at various locations across the flexible housing.

The housing may be bent into different configurations such as a configuration in which the housing has a convex surface facing the exterior region and a configuration in which the housing has a concave surface facing the exterior region.

The cameras on the curved surface of a bent housing may have different camera image capture directions. By orienting the cameras in desired directions by bending the housing, the cameras can be used to capture panoramic images or three-dimensional images.

If desired, housing bend sensors or other sensor circuitry may be used in determining the relative orientations of the cameras and this bend sensor information may be used in processing the images from the cameras to form a processed image. Configurations in which a system gathers images from multiple devices and/or includes devices with hinges may also be used.

DETAILED DESCRIPTION

An electronic device may have electronic components. The electronic components may include cameras. The cameras may have image sensors that operate at visible light wavelengths and/or other wavelengths. Visible-light cameras may sometimes be described herein as an example.

The electronic device may have portions that can be bent or otherwise reconfigured so that portions of the electronic device move and change orientation relative to each other. Cameras can be distributed across the device and can be used to capture multiple images of a scene. In some arrangements, the cameras can be oriented so that their fields of view fan out and allow the device to capture overlapping images of a scene that are stitched together to form a composite panoramic image. In other arrangements, the cameras can be oriented so that their fields of view converge on an object from different angles. This allows three-dimensional images of the object to be captured.

To allow the cameras of the electronic device to be placed in multiple different orientations, the electronic device may have a reconfigurable housing to which the cameras are mounted. The electronic device may, as an example, have portions that are sufficiently pliable to allow the electronic device to be flexed along its length and thereby configured to orient the cameras in a desired arrangement. In some illustrative arrangements, hinges or other structures may be used to allow structures in a device and the cameras mounted these structures to be reoriented with respect to each other. Arrangements in which multiple separate devices are used together in a system to capture images that are stitched together and/or that are processed to form three-dimensional images may also be used.

Figure 1:
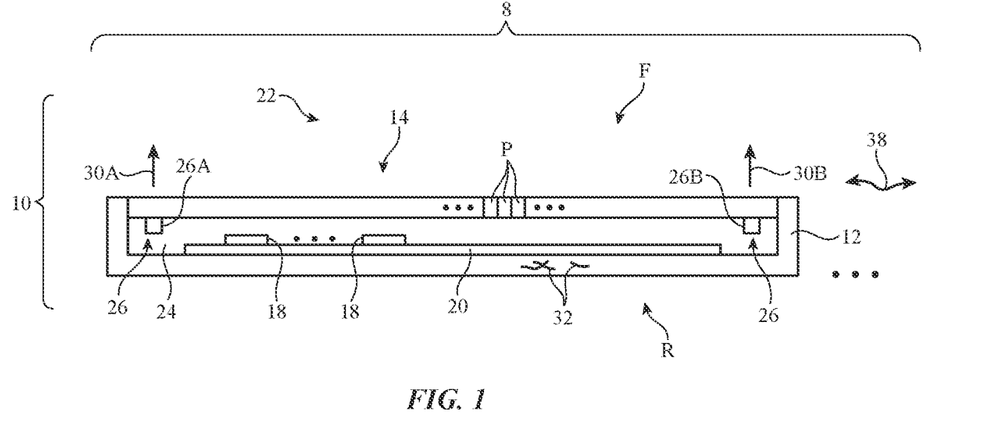
FIG. 1 is a cross-sectional side view of an illustrative electronic device in accordance with an embodiment.

An illustrative system with one or more electronic devices is shown in FIG. 1. As shown in FIG. 1, system 8 may include one or more electronic devices 10 that may communicate with each other using communications links 38. Communications links 38 may include wired and/or wireless communications paths. Each device 10 may include a housing such as housing 12. Housing 12 may have portions that can be bent into different orientations with respect to each other. In some configurations, hinges may be used to allow portions of device 10 to rotate with respect to each other. In other configurations, housing walls or other portions of housing 12 may be flexible (e.g., formed from pliable structures such as flexible polymer, fabric, etc.). Flexible housing structures may exhibit elastic deformation and may return to their original unbent shape once bending forces are removed or may be retain their bent shape following bending (e.g., for a time period of at least 10 s, at least 10 min, or other suitable time period).

If desired, housing walls, internal housing support structures, and/or portions of housing 12 may be formed from flexible fabric. The fabric may be formed from intertwined strands of material such a strands 32 and may be woven, knit, braided, etc. Optional binder (e.g., polymer) may be used to secure strands 32 to each other. In another illustrative arrangement, flexible housing walls and other flexible housing portions may be formed using flexible polymer and/or flexible sheets of metal. In general, housing 12 may be formed from any suitable structures that accommodate bending and may include polymer, metal, glass, crystalline material such as sapphire, ceramic, fabric, fibers, fiber composite material, natural materials such as wood and cotton, other materials, and/or combinations of such materials.

Housing 12 (e.g., housing walls) may enclose one or more interior regions such as interior region 24 and may separate interior region 24 from exterior region 22. Electrical components 18 may be mounted in interior region 24. Electrical components 18 may include integrated circuits, discrete components, light-emitting components, image sensors, housing bend sensors, other sensors, and/or other circuits. Components 18 may be interconnected using signal paths in one or more printed circuits such as printed circuit 20. If desired, one or more portions of the housing walls may be transparent (e.g., so that light associated with an image on a display, light for a camera, and/or light for other light-emitting or light-detecting components can pass between exterior region 22 and interior region 24).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. Displays for device 10 may have pixel arrays for displaying images for a user. As shown in FIG. 1, display 14 of device 10 may have an array of pixels P. Display 14 may be mounted on front face F of device 10 or other suitable portion of device 10. Display 14 may be an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. Display 14 may include rigid display structures and/or may be a flexible display. For example, a light-emitting diode display may be sufficiently flexible to be bent.

Each pixel array in device 10 (which may sometimes be referred to as a display panel, display substrate, or display) may be mounted under an optional transparent display cover layer (e.g., a transparent portion of housing 12) to help protect the pixel array. During operation, the pixels of display 14 produce image light for images viewed by a user.

Device 10 may have multiple cameras (image sensors) such as illustrative cameras 26. Cameras 26 of FIG. 1 include first camera 26A and second camera 26B on front face F. If desired, cameras 26 may be mounted on opposing rear face R of device 10, on sidewall structures in device 10, and/or on other portions of device 10. In general, device 10 may include any suitable number of cameras 26 (e.g., at least two, at least three, at least five, fewer than twenty, fewer than ten, etc. Each camera may have a respective field of view characterized by a respective imaging direction. The imaging direction, which may sometimes be referred to as the camera's orientation, viewing direction, camera imaging direction, camera image capture direction, or pointing direction, corresponds to the direction in which the camera is pointed and therefore the direction in which the camera captures images. In the illustrative configuration of FIG. 1, cameras 20A and 20B are oriented in the same direction (the Z direction), as shown by camera image capture direction 30A of camera 26A and parallel camera image capture direction 30B of camera 26B.

By providing the structures of device 10 with the ability to bend (by flexing about a bend axis by deforming fabric, flexible polymer, or other pliable structures, by rotating flexible and/or rigid structures about one or more hinges, and/or by otherwise bending device 10), device 10 can be placed in multiple configurations, each characterized by a different set of camera image capture directions.

Figure 2:
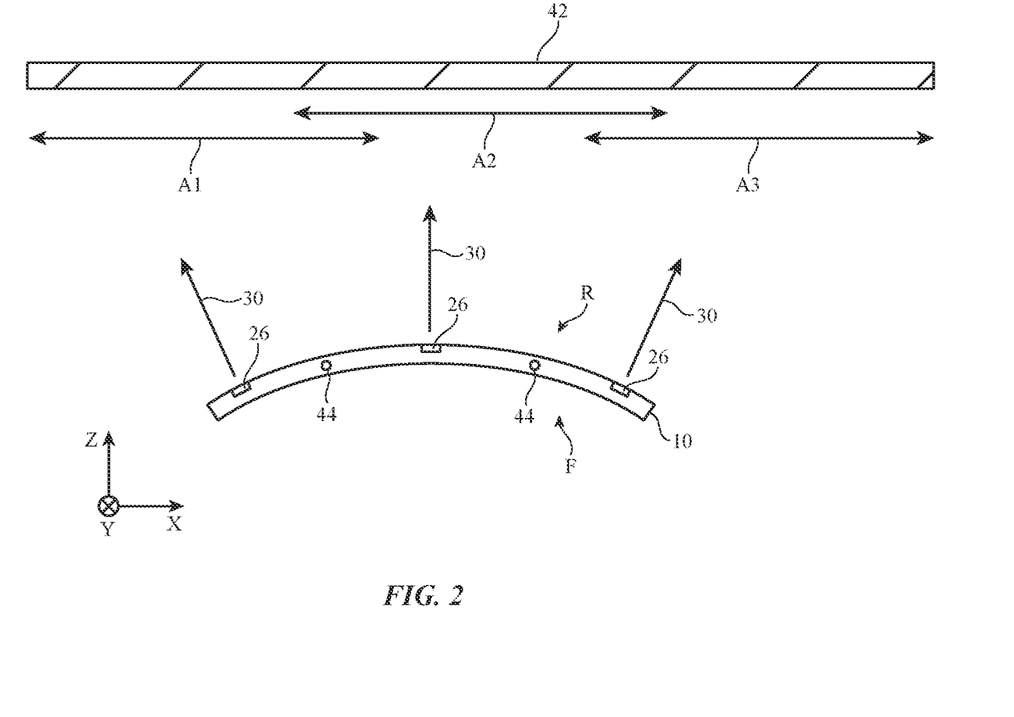
FIG. 2 is a cross-sectional side view of an illustrative flexible electronic device that has been bent into a convex shape to capture a panoramic image using multiple cameras in the device in accordance with an embodiment.

Consider, as an example, the configuration of FIG. 2 in which device 10 has three cameras 26 on rear face R with three associated camera image capture directions 30. In the example of FIG. 1, device 10 has been bent from an initial planar shape (or other initial shape) so that rear face R takes on a convex shape (e.g., a convex cross-sectional profile). The convex curved shape (with curved cross-sectional profile) of the exterior surface of device 10 on which cameras 26 are mounted allows cameras 26 to simultaneously capture images for stitching together to form a panoramic image. In this configuration, cameras 26 of FIG. 2 may be used to capture images of respective overlapping portions A1, A2, and A3 of real-world object 42 (e.g., an indoor or outdoor scene). During image capture operations, the control circuitry of device 10 can use each of cameras 26 to simultaneously (or nearly simultaneously) capture these images and can stitch the captured images together in real time to form a static or moving panoramic image. When images are captured simultaneously in this way, artifacts due to object motion may be reduced or eliminated. Display 14 may be formed on front face F and may be used to display the panoramic image in real time (e.g., the image content that is being captured by cameras 26 can be previewed). This allows a user to orient device 10 satisfactorily with respect to the horizon and/or to otherwise capture desired images.

To assist the control circuitry with image stitching operations, device 10 may be provided with one or more optional housing bend sensors such as bend sensors 44. Bend sensors 44 may be formed from strain gauge sensors, capacitive sensors, optical sensors, resistive sensors, rotational sensors, compasses, accelerometers, other sensors for measuring position and/or orientation, and/or other sensors. Because sensors 44 determine the orientations of the portions of housing 12 that support cameras 26, sensors 44 can be used in measuring the orientations of cameras 26 with respect to each other. For example, bend sensors 44 may determine that the camera image capture directions of the left and right cameras 26 of FIG. 2 are oriented respectively at −25° and +25° with respect to the orientation of the central camera 26. This information can then be used in real time by the control circuitry of device 10 in processing the captured images (e.g., in determining how much image overlap is to be expected between adjacent images). By using bend sensors 44 to measure the camera image capture directions of cameras 26, image stitching accuracy can be enhanced. If desired, dynamic movements of the housing and camera orientations by the user can be accommodated. For example, if a user is capturing moving images and desires to widen the view of the panoramic image, sensors 44 can detect this widening in real time so that the control circuitry of device 10 can dynamically update the captured images by accurately stitching the image together based on the real time sensor data. If desired, image stitching operations can be performed without using camera orientation data (e.g., by using image processing techniques to identify overlapping image portions without using orientation information). The use of bend sensors 44 to assist during image capture operations is illustrative.

Figure 3:
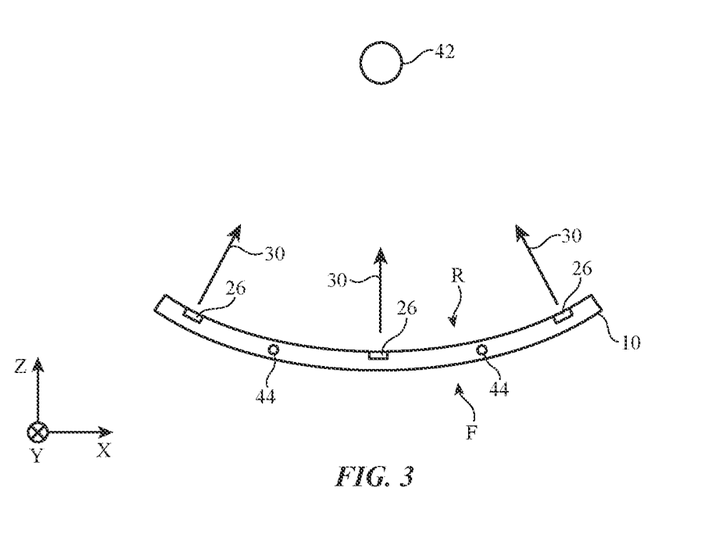
FIG. 3 is a cross-sectional side view of an illustrative flexible electronic device that has been bent into a concave shape to capture a three-dimensional image using multiple cameras in the device in accordance with an embodiment.

In the example of FIG. 3, device 10 has been bent so that front face F has a concave shape (e.g., a concave cross-sectional surface profile). With this configuration, cameras 26 are pointed inwardly and converge towards real-world object 42 from different angles. This allows cameras 26 to perform three-dimensional imaging operations (e.g., to capture a three-dimensional view of object 42).

In general, device 10 may have a shape that is normally planar (when relaxed and not bent) or other suitable shape. Device 10 may bend in one direction (e.g., to allow rear face R to alternate between planar and convex shapes or to allow rear face R to alternate between planar and concave shapes) or device 10 may be sufficiently flexible to be bent into convex, planar, and concave shapes. In some configurations, the pliable materials of device 10 that allow device 10 to bend may be sufficiently stiff to temporarily hold device 10 in its bent shape after bending.

Figure 4:
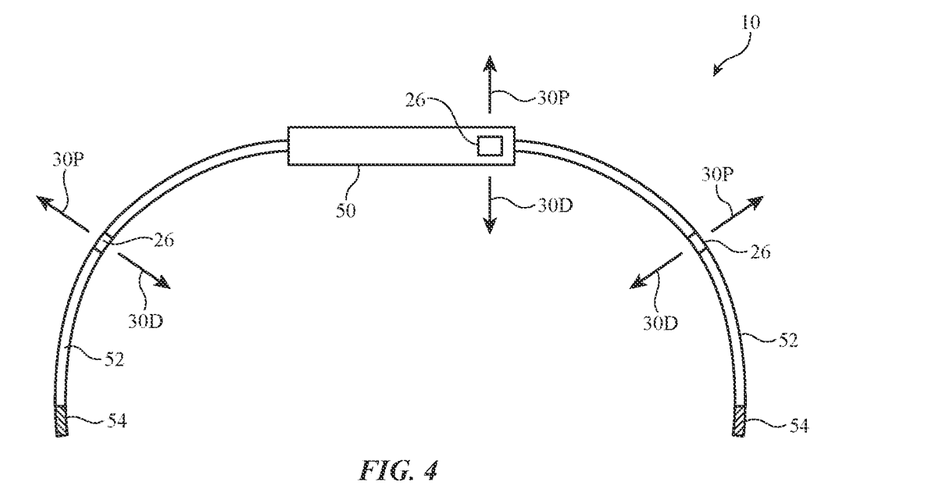
FIG. 4 is a cross-sectional side view of an illustrative flexible device such as a wristwatch with a flexible wristband in accordance with an embodiment.

FIG. 4 shows how cameras 26 may be formed on a wristwatch device. Wristwatch device 10 has main unit 50 and flexible band 52. Optional clasps 54 may help hold band 52 together around a user's wrist as device 10 is being worn. Cameras 26 may be mounted on band 52 and/or main unit 50 and may be directed outwardly (e.g., to capture panoramic images as shown by camera image capture directions 30P) and/or inwardly (e.g., to capture three-dimensional images when device 10 is not being worn, as shown by camera image capture directions 30D). When clasps 54 are attached to each other, inwardly facing cameras 26 may surround an object from all sides. A user may move device 10 along a longitudinal axis associated with an elongated object to capture a three-dimensional scan of the object from all sides.

Figure 5:
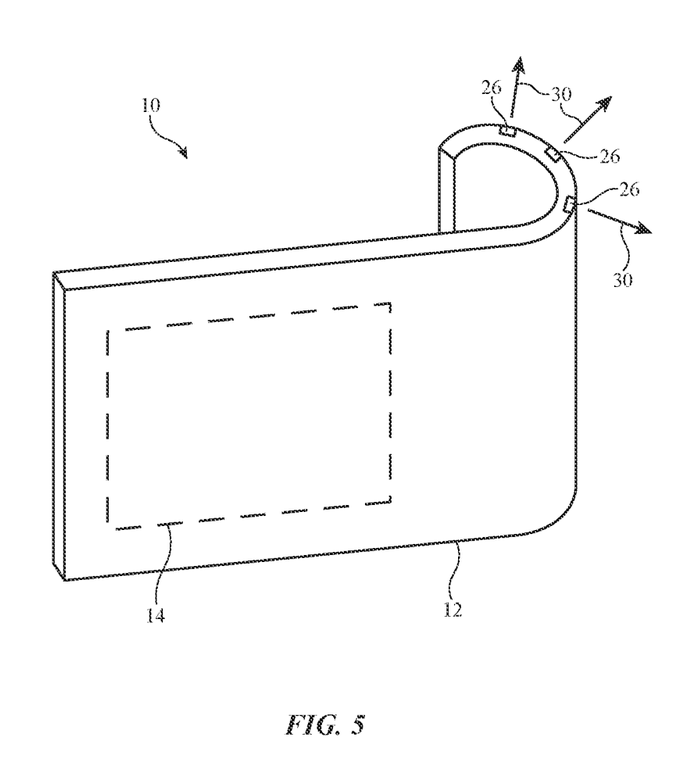
FIG. 5 is a perspective view of an illustrative flexible device with a display that is configured to display a preview of an image captured using multiple cameras located on a curved housing wall in accordance with an embodiment.

In the example of FIG. 5, an end of device 10 has been bent into a curled shape. Cameras 26 on the curved surface of the bent portion of device 10 can capture panoramic images (when facing outwardly) or can capture three-dimensional images of an object that is partially or fully surrounded by cameras 26 (when facing inwardly). Display 14 may be used to display a preview of an image formed by processing the individual images captured by respective cameras 26. For example, display 14 may display a composite image formed by stitching together overlapping images from multiple respective cameras 26 (e.g., to form a real-time preview image that allows a user to orient device 10 and cameras 26 as desired to capture a desired panorama). The portion of display 14 that is used in displaying the preview image may be located partially or fully on a curved portion of device 10 and/or may be located partially or fully on a planar (unbent) portion of device 10.

Figure 6:
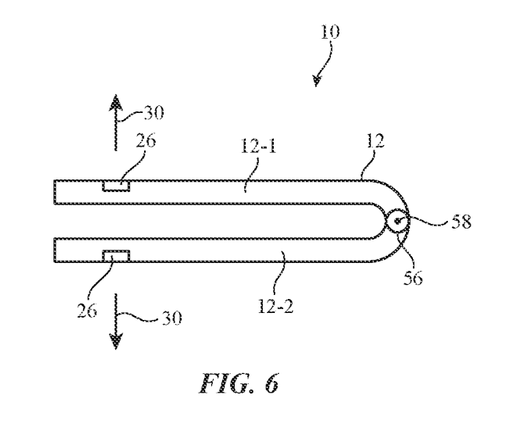
FIG. 6 is a cross-sectional side view of an illustrative electronic device that has been placed in a configuration with cameras facing away from each other in accordance with an embodiment.
Figure 7:
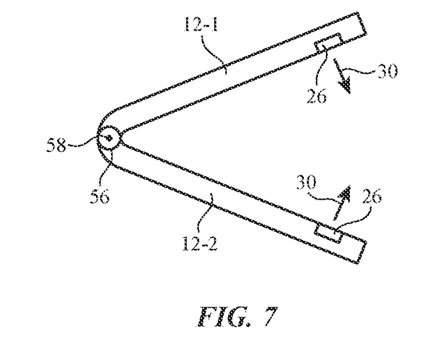
FIG. 7 is a cross-sectional side view of an illustrative electronic device that has been placed in a configuration with cameras facing towards each other in accordance with an embodiment.

FIGS. 6 and 7 show how device 10 may have a hinge such as optional hinge 56. Hinges such as hinge 56 may be placed at one or more locations along the length of housing 12 to allow device 10 to be bent into desired configurations. If desired, hinges 56 may be replaced by pliable housing walls and/or other bendable device structures. Display 14 may be located on the same housing face as cameras 26 and/or on an opposing face.

Due to the presence of bendable structures such as hinge 56 (or flexible housing portions), housing 12 may be bent about bend axis 58. As shown in FIG. 6, for example, device 10 may be bent from a first configuration (e.g., a planar configuration) into a second configuration in which housing portion 12-1 and housing portion 12-2 are parallel to each other with cameras 26 facing outwardly. Camera image capture directions 30 in this configuration face away from each other. As shown in FIG. 7, device 10 may be bend about axis 58 so that housing portions 12-1 and 12-2 are oriented towards each other (e.g., so that camera image capture directions 30 are oriented toward opposing sides of an object, allowing device 10 to capture a three-dimensional image of the object). The relative angle between the surface normals of respective portions 12-1 and 12-2 may, in general, range between 0 and 360°. In some device configurations, the range of possible angles permitted by hinge 56 (or flexible portions of housing 12 formed from fabric, pliable polymer, etc.) may be smaller (e.g., 0-180°, 180-360°, etc.).

Figure 8:
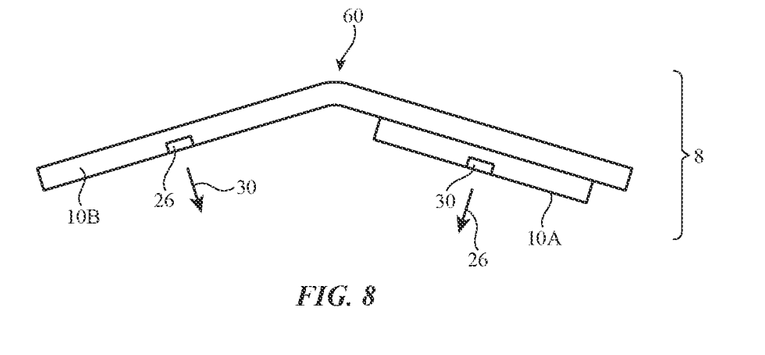
FIG. 8 is a cross-sectional side view of an illustrative system with a flexible cover and removable device in accordance with an embodiment.

In the example of FIG. 8, system 8 includes two devices. First device 10A is a portable device such as a cellular telephone, tablet computer, etc. and second device 10B is a cover with a camera (sometimes referred to as a case, enclosure, accessory keypad, etc.). Devices 10A and 10B may use their cameras 26 to capture panoramic images and/or three-dimensional images. Wired and/or wireless communications may be used to provide image data from one device to the other or to another electronic device in system 8 for processing (e.g., to produce three-dimensional images from multiple camera images captured at different orientations, to stitch overlapping images together to form a panoramic image, etc.). Device 10B may have a bendable portion such as portion 60 that allows device 10B to be folded and unfolded. Device 10B may also have straps, a recess, or other structures that are configured to receive and hold removable device 10A against device 10B. Once devices 10A and 10B have been mechanically coupled together in this way, device 10B may be bent into various desired shapes using a hinge, flexible fabric, flexible polymer, or other flexible structure in portion 60. Cameras 26 can capture images while device 10B is in a desired configuration. Portion 60 may allow camera image capture directions 30 to be oriented in a fanning out arrangement (e.g., to capture panoramic images) or a converging arrangement (e.g., to capture three-dimensional images). Device 10B of FIG. 8 and devices 10 of FIGS. 6 and 7 and other devices 10 may, if desired, have bend sensors 44 for gathering information on the relative orientation of cameras 26 (e.g., differences between respective camera image capture directions) for use by the control circuitry of device 10 during image processing operations (e.g., when stitching together camera images to form a panoramic image).

Figure 9:
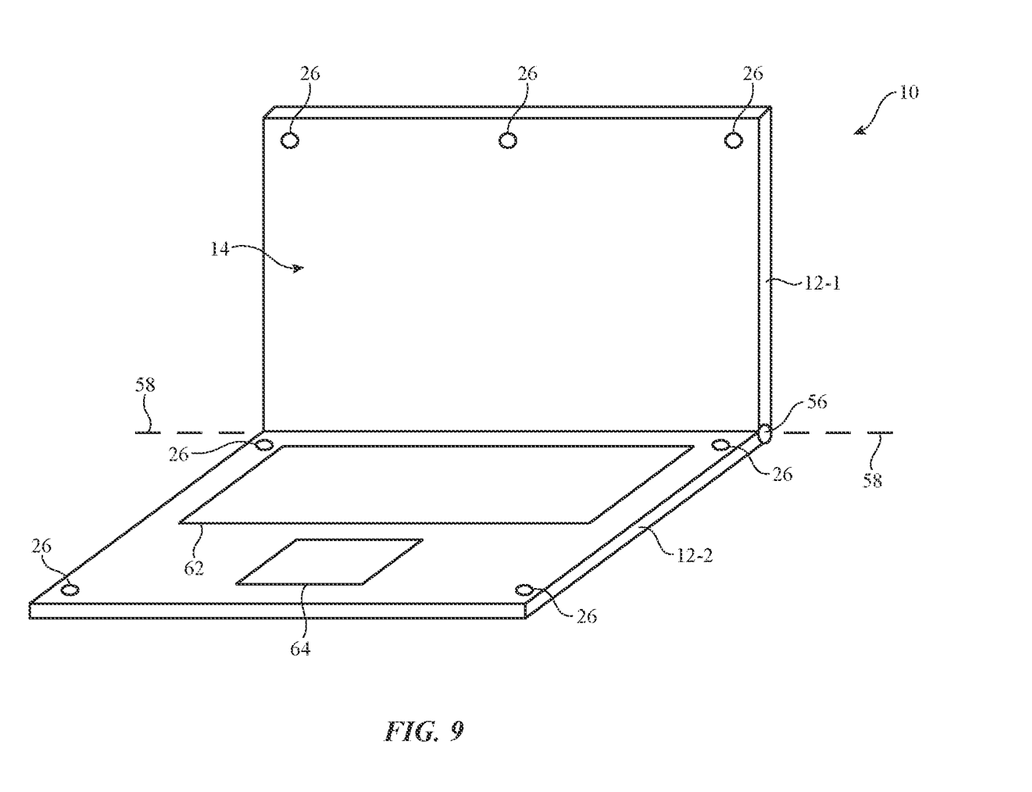
FIG. 9 is a perspective view of an illustrative electronic device such as a laptop computer with multiple cameras in accordance with an embodiment.

In the illustrative configuration of FIG. 9, device 10 is a laptop computer having a first housing portion 12-1 that rotates relative to a second housing portion 12-2 about bend axis 58 using hinge 56. Display 14 may be mounted in second housing portion 12-2. Keyboard 62 and trackpad 64 may be mounted in first housing portion 12-1. Cameras 26 may be mounted at locations the inwardly-facing surfaces of portions 12-1 and 12-2 (e.g., at one or more locations about the peripheral edges of portions 12-1 and 12-2). In these locations, three-dimensional images may be captured of objects in locations such as illustrative object location 70. Three-dimensional air gestures (e.g., hand gestures) may also be captured using cameras 26. In device 10 of FIG. 9 and/or the other devices 10 described herein, cameras 26 may be visible light cameras, infrared cameras, ultraviolet cameras, cameras that include time-of-flight measurements, and/or cameras that use structured light, and/or other optical sensors for gathering image data and/or other optical readings. Visible-light cameras that use two-dimensional visible-light digital image sensors are sometimes described herein as an example.

Figure 10:
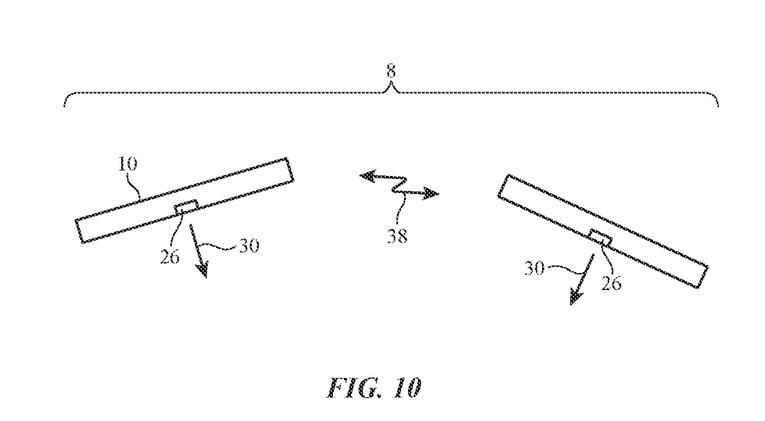
FIG. 10 is a side view of an illustrative system with wirelessly connected devices that may each have one or more cameras in accordance with an embodiment.

FIG. 10 shows and illustrative system arrangement with two devices that are not physically connected. Devices 10A and 10B in system 8 of FIG. 10 may communicate wirelessly with each other and/or with additional electronic devices in system 8 using wireless communications links 38. Images may be captured using multiple cameras 26 and processed to form three-dimensional images and/or panoramas. The relative orientations of devices 10A and 10B (and, if desired, additional devices with cameras 26 in system 8) may be determined by measuring the absolute orientation of each device 10 (e.g., by measuring the orientation of each device's camera 26 using an inertial measurement unit based on components such as an accelerometer, compass, and/or gyroscope or other orientation sensor) and by using the absolute orientation information to determine the relative orientations of devices 10A and 10B. Information on the camera image capture direction of each camera 26 during image capture operations and image data can then be transferred to one of devices 10A and 10B and/or other equipment in system 8 for processing to form three-dimensional images, panoramic images, and/or other images. The orientation information may help enhance accuracy when processing images to form a three-dimensional image or a panoramic image. For example, the orientation information can be used to determine which sides of an object are being imaged, can be used to help determine the degree to which a pair of adjacent images overlap, etc.

Figure 11:
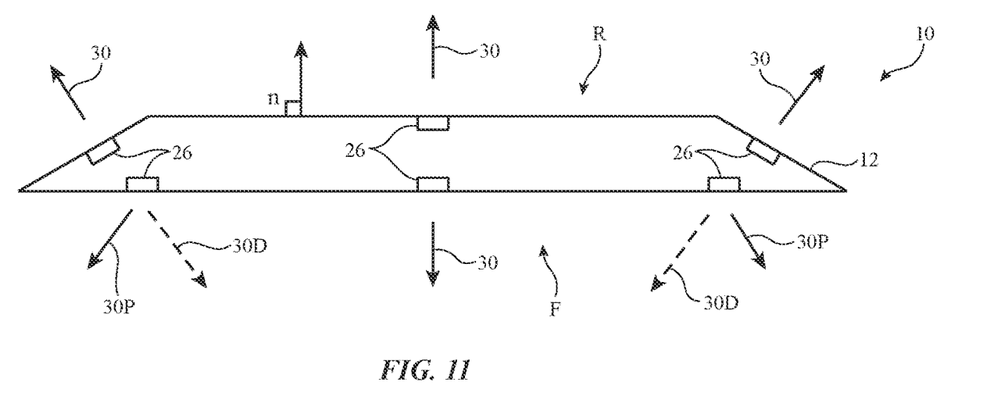
FIG. 11 is a top view of an illustrative electronic device with multiple cameras in accordance with an embodiment.

If desired, device 10 may have a rigid housing that allows multiple cameras 26 to point in different directions. As shown in the top view of device 10 of FIG. 11, for example, rear face R of housing 12 may have angled left and right edges. One or more displays such as display 14 may be mounted on the front or rear of housing 12 and may be used in previewing images (e.g., previewing panoramic images formed by stitching together images captured from cameras 26 simultaneously). Cameras 26 on portions of housing 12 (e.g., the left and right edges of rear face R and the central planar portion of rear face R) will have camera image capture directions 30 that angle away from the camera image capture direction of the camera 26 in the center of rear face R and that therefore angle away from rear face surface normal n). This fanning out of the camera image capture directions of the cameras 26 on rear face R allows these cameras to be used to capture three simultaneous overlapping images for a panorama. On front face F, cameras 26 are mounted on a planar front surface of housing 12, but may be configured so that their camera image capture directions fan out (see, e.g., camera image capture directions 30P) to capture a panoramic image or so that their camera image capture directions converge (see, e.g., camera image capture directions 30D) to capture a three-dimensional image. Cameras 26 on front face F of FIG. 11 and/or on other portions of housing 12 may have mechanical mounting arrangements and/or optical components that determine their respective camera image capture directions. For example, cameras 26 on front face F may all be mounted under a planar cover layer but may be angled in different fixed directions (e.g., to fan out or to converge). If desired, mirrors, prisms, lenses, gratings, and/or other optical components may be used in establishing desired camera image capture directions for cameras 26. Fixed optical systems and/or adjustable optical systems (e.g., steerable mirrors, etc.) can be used in establishing the camera image capture directions for cameras 26.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device having a first face and an opposing second face, comprising:
    a housing having a first housing portion and a second housing portion;
    a display in the housing;
    a first camera in the first housing portion at the first face and configured to capture a first image along a first camera image capture direction;
    a second camera in the second housing portion at the second face and configured to capture a second image along a second camera image capture direction; and
    control circuitry configured to stitch the first and second images together based on the first camera image capture direction and the second camera image capture direction to form a three-dimensional image when the first and second camera image capture directions are directed inwardly.

2. The electronic device defined in claim 1 wherein the first housing portion is configured to rotate relative to the second housing portion between an open state and a closed state.

3. The electronic device defined in claim 2 wherein the first camera image capture direction is opposite the second camera image capture direction in the closed state.

4. The electronic device defined in claim 3 wherein the first camera image capture direction is the same as the second camera image capture direction in the open state.

5. The electronic device defined in claim 4 wherein the housing has a first surface and an opposing second surface in the open state, wherein the first and second cameras receive light through the first surface, and wherein the display is at the second surface of the housing.

6. The electronic device defined in claim 5 further comprising:
    sensor circuitry configured to detect a difference between the first camera image capture direction and the second camera image capture direction.

7. The electronic device defined in claim 6 wherein the control circuitry is configured to dynamically stitch together the first and second images based at least partly on the detected difference as the first and second housing portions are moved relative to each other.

8. The electronic device defined in claim 7 wherein the control circuitry is configured to produce a panorama by stitching together the first and second images and wherein the display is configured to display a preview of the panorama.

9. The electronic device defined in claim 1 wherein the housing is a flexible housing that is configured to be bent to change the first camera image capture direction and the second camera image capture direction.

10. The electronic device defined in claim 9 further comprising:
sensor circuitry configured to detect a difference between the first camera image capture direction and the second camera image capture direction.

11. The electronic device defined in claim 10 wherein the sensor circuitry comprises a housing bend sensor configured to sense bending in the flexible housing.

12. The electronic device defined in claim 11 wherein the control circuitry is configured to stitch the first and second images together based at least partly on the detected difference between the first camera image capture direction and the second camera image capture direction.

13. An electronic device comprising:
a housing having a first housing portion and a second housing portion that are configured to move relative to one another between an open position and a closed position, wherein the housing has a first surface and an opposing second surface in the open position;
a display at the first surface of the housing;
a first camera in the first housing portion that receives light through the second surface of the housing in a first direction;
a second camera in the second housing portion that receives light through the second surface of the housing in a second direction, wherein an angle between the first and second directions is configured to change as the first housing portion moves relative to the second housing portion, the first direction is opposite the second direction when the housing is in the closed position, and the first and second cameras are configured to capture first and second images when the housing is in the closed position;
sensor circuitry that detects the angle between the first and second directions; and
control circuitry configured to stitch together the first and second images based on the detected angle between the first and second directions.

14. The electronic device defined in claim 13 wherein the first and second directions are the same when the housing is in the open position.

15. An electronic device comprising:
a bendable housing;
a flexible display in the bendable housing;
a first camera in the bendable housing that receives light from a first direction;
a second camera in the bendable housing that receives light from a second direction that is different from the first direction, wherein the flexible display overlaps the first and second cameras; and
control circuitry that is configured to stitch together images produced by the first camera and the second camera based on a difference between the first direction and the second direction.

16. The electronic device defined in claim 15 further comprising:
sensor circuitry configured to measure the difference between the first direction and the second direction based on bending of the bendable housing.

17. The electronic device defined in claim 15 wherein the difference between the first direction and the second direction is configured to be 180° when the bendable housing is bent into a closed position.

18. The electronic device defined in claim 15, wherein the bendable housing is configured to bend between convex, planar, and concave orientations.

19. The electronic device defined in claim 1, wherein the first and second housing portions are configured to be adjusted to adjust the first and second camera image capture directions to converge toward a real-world object from different angles.

20. The electronic device defined in claim 1, wherein the first and second housing portions are configured to move relative to one another between an open position and a closed position, the housing has a first surface and an opposing second surface in the open position, and the first surface has a concave shape when the first and second camera image capture directions are directed inwardly.

* * * * *